June 2, 1959  M. B. MUELLER ET AL  2,888,710
APPARATUS FOR MOVING TUBULAR STRUCTURES
THROUGH A PROCESSING STATION
Filed May 31, 1957  4 Sheets-Sheet 1

INVENTORS
MAX B. MUELLER
BENJAMIN S. PENLEY
BY Ernest A. Polin
ATTORNEY

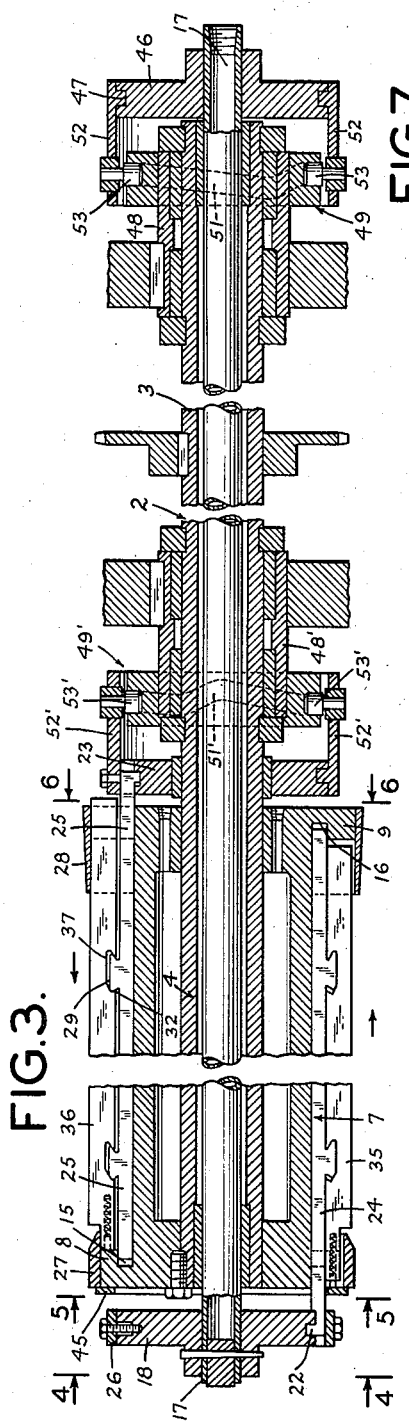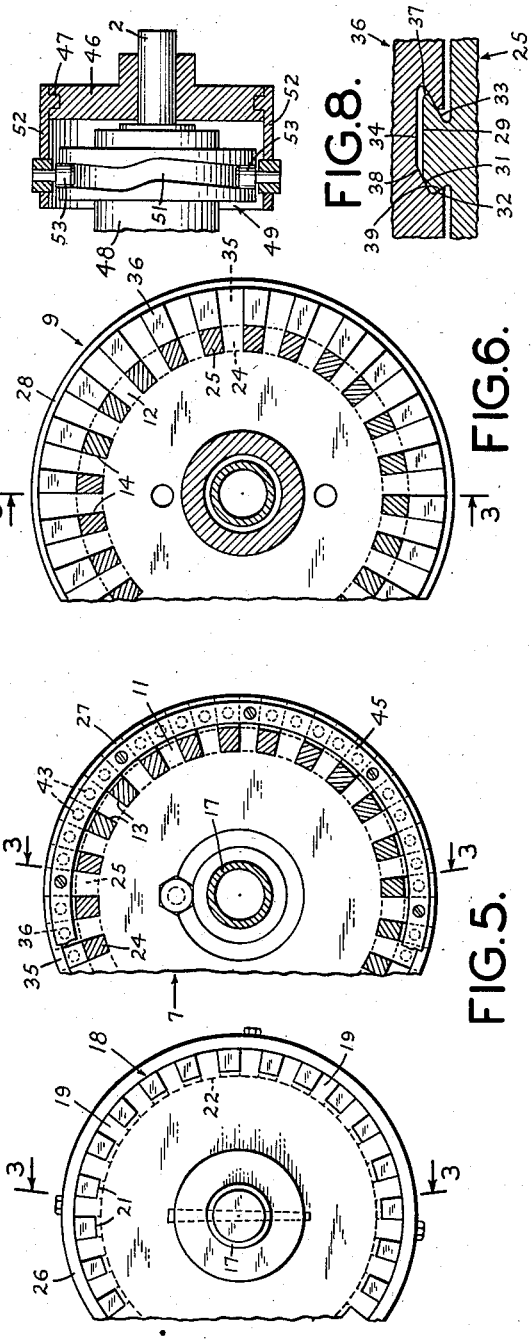

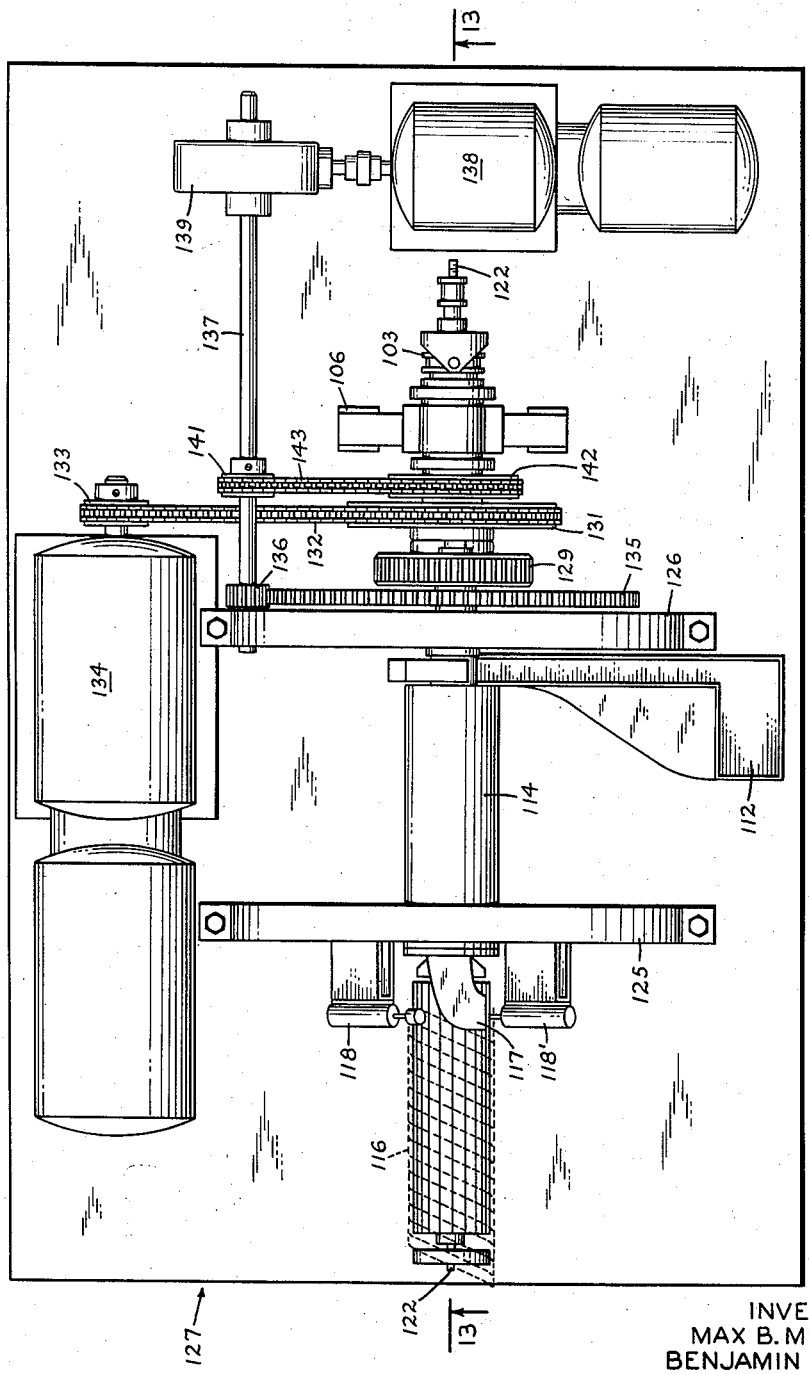

June 2, 1959   M. B. MUELLER ET AL   2,888,710
APPARATUS FOR MOVING TUBULAR STRUCTURES
THROUGH A PROCESSING STATION
Filed May 31, 1957   4 Sheets-Sheet 4
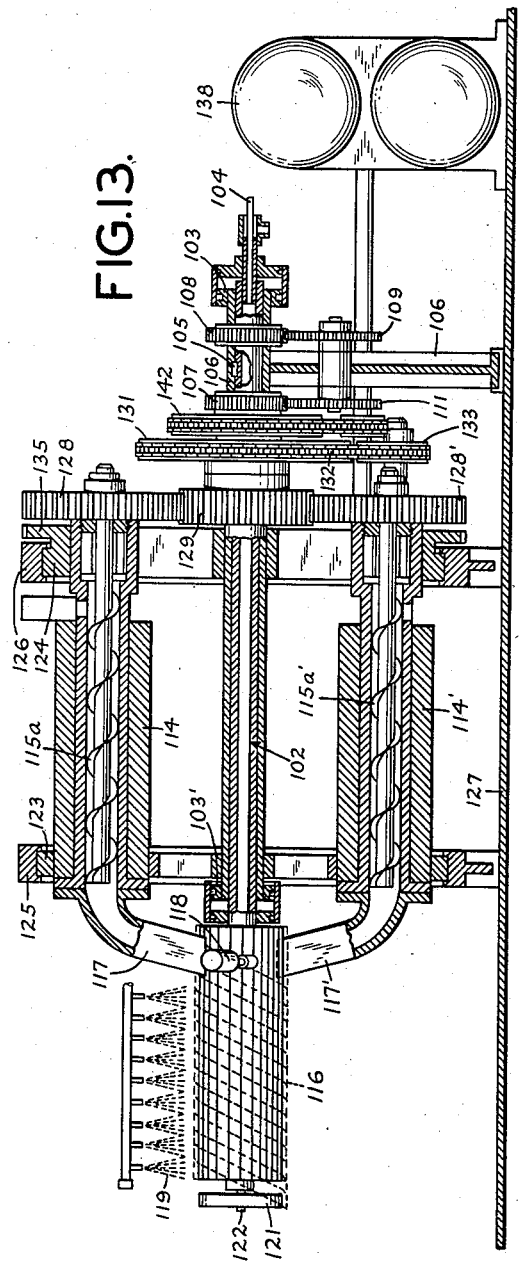
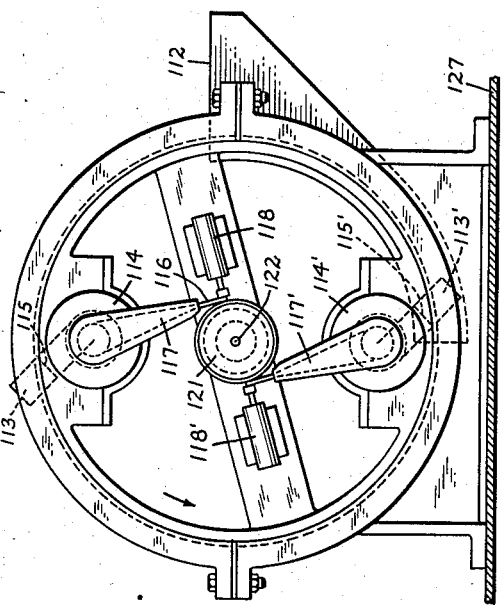
INVENTORS
MAX B. MUELLER
BENJAMIN S. PENLEY
BY Ernest A. Polin
ATTORNEY

2,888,710

APPARATUS FOR MOVING TUBULAR STRUCTURES THROUGH A PROCESSING STATION

Max B. Mueller, Upper Providence, Pa., and Benjamin S. Penley, Bergenfield, N.J., assignors to Allied Chemical Corporation, New York, N.Y., a corporation of New York Application May 31, 1957, Serial No. 662,788

7 Claims. (Cl. 18—1)

This invention relates to an improved apparatus for moving tubular structures through a processing station. More particularly, the invention pertains to such apparatus which is eminently suitable for producing hollow, spirally wound tubes or pipes from flexible material.

Various industries, including the building, agricultural and chemical industries, require hollow structures, e.g. tubes or pipes, constructed of flexible material such as plastics because of their lightness and acceptable physical, chemical and electrical characteristics. In particular, there is a great demand for apparatus which makes it feasible to produce tubes or pipes from flexible material in continuous strip or ribbon form, for instance, plastic or plastic-containing material, of a wide range of sizes, including diameters of several inches and higher, for example, in the range of about 6" to 36".

A primary object of the present invention is to provide an improved apparatus for moving tubular structures through a processing station.

Another object of the present invention is to provide improved apparatus for producing hollow, spirally wound tubes or pipes from flexible material.

Still another object of the invention is to provide an improved apparatus for continuously advancing a hollow, spirally wound tube or pipe along a mandrel as it is formed.

Other objects and advantages of the invention will appear hereinafter.

According to one aspect of the present invention, an improved apparatus for moving tubing or conduit through a processing station comprises a mandrel, a plurality of parallel, attenuated, longitudinally reciprocable feeding members spaced around and longitudinally disposed on the mandrel to provide at least a portion of the circumferential surface thereof, and means engaging said members and adapted to move said members cyclically outwardly from the mandrel in engagement with the inner surface of the tubing, forward with respect to the mandrel while in engagement with the tubing, inward out of engagement with the tubing and backward with respect to the mandrel while out of engagement with the tubing, whereby the tubing is advanced along the mandrel.

In preferred practice of this aspect of the invention, the tubing is formed by wrapping a continuous strip of flexible material, for example, a thermoplastic substance, in the form of a spiral around the mandrel. This is accomplished either by rotating the mandrel and applying the strip of material from a stationary source or by maintaining the mandrel stationary and rotating a feeding device for the strip of material around it. The mandrel advances the tubing at such speed that leading and trailing edges of the strip material overlap. These adjacent courses of strip material are then adhered to one another and, if an underlying layer be present, to it, as by use of adhesives, or, if the material is thermoplastic, by suitable pressure means and at temperature to effect welding thereof.

If it is desired to produce multilayer tubing, the mandrel may be rotated and strips of material may be applied from two sources, both a rotating source and a stationary source, to effect simultaneous left and right ply winding. In this production of multilayer tubing, different types of material may be used for adjacent layers; e.g., the inner layer could be composed of thermoplastic material while the outer layer could be composed of metal mesh or wire.

Another aspect of the invention for moving tubing or conduit through a station which forms or treats the tubing comprises a mandrel, a plurality of parallel, attenuated, longitudinally reciprocable outer or feeding members spaced around and longitudinally disposed on the mandrel, a set of inner or actuating reciprocable members engaging the outer reciprocable members, said actuating members being longitudinally disposed between the mandrel and the feeding members and being adapted upon being reciprocated axially of the mandrel to force the outer members cyclically outward in engagement with the inner surface of the tubing, forward with respect to the mandrel while in engagement with the tubing, inward out of engagement with the tubing and backward with respect to the mandrel while out of engagement with the tubing, and driving means for reciprocating the actuating members longitudinally or axially of the mandrel, whereby the tubing is advanced along the mandrel.

A specific embodiment of the invention, particularly well-adapted for application of spiral winding to or for fabricating spirally wound tubing comprises a mandrel having an outer surface which is composed of two sets or more, dependent on the size of the mandrel, of independently driven outer and corresponding inner reciprocable members, the individual members of each set alternating with the individual members of the other set(s). The outer reciprocable members are disposed on the mandrel and may be adapted to receive a continuous strip of winding material in spiral form. When, as in this form of the invention, the tubing being advanced is fabricated on the mandrel, each outer reciprocable member preferably has associated therewith yieldable or resilient means for exerting axial force against its forward motion. In addition, separate driving means for each set of inner members is adapted to effect reciprocation of one or more sets out of phase with the other set(s) to insure continuous feed of the tubing. Conveniently, the driving of the inner members may be by cams which are preferably displaced at a suitable angle, e.g. about 45°–135°, from one another, so that at least one set of inner members is at any given instant in the outwardly extended, forwardly moving phase of the cycle.

The cam or other driving means for the inner members is preferably arranged and adapted to move all members of the set simultaneously forward and backward, with the backward or retracting motion being several times more rapid than the forward or feeding motion so as to minimize the non-feeding period. Thus, when two or more sets of feeding members are provided and operated in out-of-phase cycles, all of the sets of feeding members are operatively feeding for a substantial portion of the operating cycle.

In preferred embodiments of the invention, the cyclic movement of the outer reciprocable members is effected by providing the inner and outer reciprocable members with cooperating, adjacent, lifting, expanding or separating surfaces, having at least a portion thereof angularly inclined with respect to the mandrel, which are adapted to engage upon forward motion of the inner reciprocable members to move the outer reciprocable members outwardly, as by wedging effect, and to disengage upon reverse motion to permit the outer reciprocable members to move inwardly. When, as is preferred, there are means exerting yieldable force against forward motion of the outer reciprocable members, the cooperating, expanding surfaces are supplemented by a second set of cooperating surfaces having at least a portion thereof angularly inclined with respect to the mandrel but with slope the reverse of that providing for expansion of the outer members, such surfaces being arranged and adapted to be disengaged during forward motion and to become engaged after reverse motion has been initiated, and during their engagement to pull the outer members inwardly toward the axis of the mandrel and out of contact with the inner surface of the tubing being advanced.

In the interest of precise control over the extent of outward movement of the outer or feeding members of the assembly and over the force exerted by them on the advancing tubing, it is preferred that at least one of the wedging surfaces provide or be associated with a stop limiting the outward motion and permitting forward motion of the outer members. Preferably, the stop is in the form of matching angular surfaces on each member having slope the reverse of that of the lifting surfaces and disposed so that upon engagement the stop and lifting surfaces cooperate to provide the axial forward motion of the outer members. A similar stop may be provided with surfaces adapted to retract the feed members.

For compactness of the assembly, of particular significance when the tubing is to be of relatively small diameter, say 6" or less, the cooperating angular surfaces effecting outward and inward motion may be provided by suitably shaped projections from one of the reciprocating members, for example, the actuating member, and a corresponding number of complementary openings in the other member, for example, the outer or feeding member, the openings preferably, however, being somewhat longer than the projections.

In the drawings wherein are shown two embodiments of the improved apparatus of the present invention:

Figure 3 is a longitudinal section taken generally along line 3—3 of Figures 2, 4, 5 and 6 showing the mandrel assembly in detail;

Figure 2:
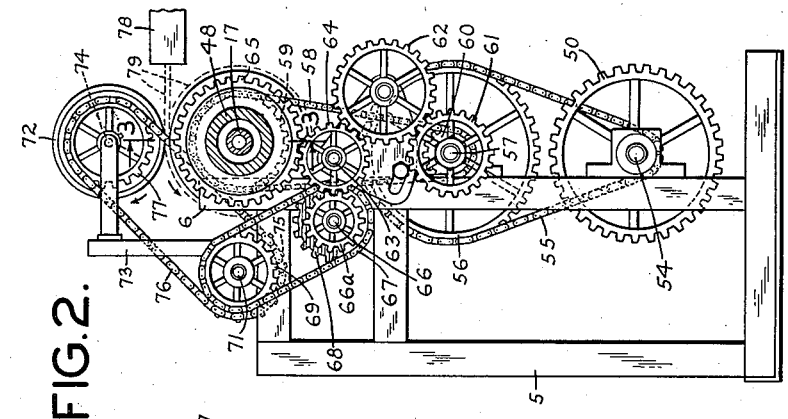
Figure 2 is an end elevation, partly in section, of Figure 1 showing the drive means of the apparatus.
Figure 1:
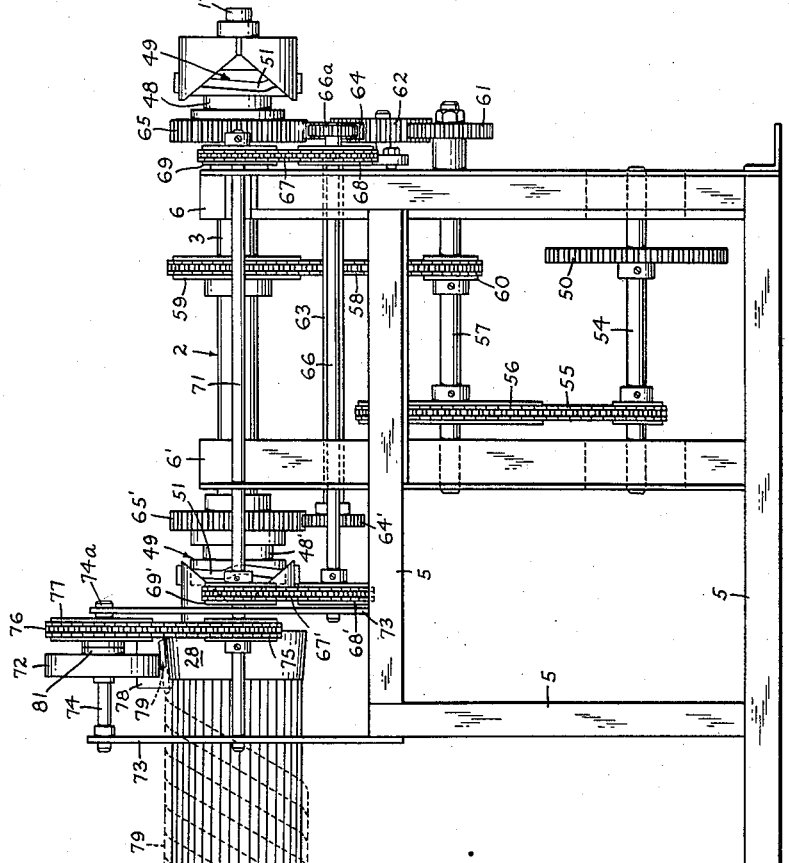
Figure 1 is a side elevation of one embodiment of the present invention.
Figure 10:
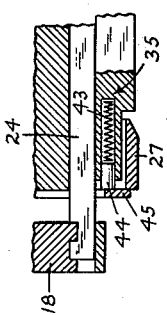
Figure 9:
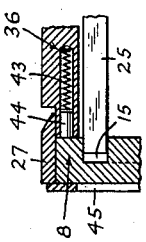

Each of Figures 4, 5 and 6 is a transverse section along the correspondingly numbered lines of Figure 3, illustrating method of assembly of the feed and actuating reciprocating members at the ends thereof;

Figure 7 is an elevation of a preferred means for driving the reciprocating members;

Figure 8 is an enlarged longitudinal section of a portion of feed and actuating reciprocating members, illustrating a method of producing the outward and inward motion of the former during its reciprocation;

Figures 9 and 10 are enlarged transverse sections of ends of outer or feed reciprocating members, showing methods for yieldably resisting forward motion thereof;

Figure 11 is a plan view of a second embodiment of the present invention;

Figure 12 is an end elevation of the apparatus of Figure 11;

Figure 13 is a longitudinal section taken generally along line 13—13 of Figure 11.

One embodiment of the improved apparatus for producing hollow, spirally wound tubes or pipes from thermo-plastic material is shown by way of example in Figures 1 to 10. As set forth in these drawings, a self-stripping mandrel includes a tubular main shaft 2 having a drive end 3 and an operating end 4 which is mounted on a main support frame 5 by bearings 6 and 6', bearing 6 being adjacent to the drive end of the shaft and bearing 6' being proximate to the center of the shaft. A spool 7 (Fig. 3) comprising an attenuated hollow cylinder bearing integral, flat, cylindrical disk-like flanges 8 and 9 at its discharge end and charge end, respectively, is mounted on the operating end of shaft 2. Each of flanges 8 and 9 is circumferentially dentated (Figs. 5 and 6) to provide a gear-like surface having a plurality of spaced teeth 11 and 12, respectively, separated by notches 13 and 14, respectively. The teeth of discharge-end flange 8 are opposite the notches between the teeth of charge-end flange 9 at the other end of spool 7. Each of flanges 8 and 9 bears on the flat surface facing the other flange an annular depression or slot 15 and 16, respectively, within each tooth contiguous to the surface of spool 7. These slots extend generally parallel to the axis of the spool and are of depth less than the thickness of the flange.

A tubular inner shaft 17 is oscillatively mounted within main shaft 2 and projects outwardly from each end thereof. On the end of inner shaft 17 projecting from the operating end of main shaft 2 there is mounted adjacent to discharge-end flange 8 an end spider 18 which may be a thin, flat cylindrical disk having on its curved face a plurality of teeth 19 (Fig. 4) separated by flat-bottomed notches 21. A peripheral groove 22 (Figs. 3 and 4) bisects the ends of teeth 19. A middle spider 23 of structure similar to that of end spider 18, including teeth, flat-bottomed notches and a peripheral groove is slidably mounted on main shaft 2 adjacent to charge-end flange 9 of spool 7.

End spider 18 and middle spider 23 each bear a set of generally parallel, attenuated, inner, alternately reciprocable bars 24 and 25, respectively. A typical inner reciprocable bar may have a cross-section throughout most of its length approximately that of an isosceles trapezoid, the shorter parallel side conforming generally to and lying along the outer surface of the attenuated hollow cylinder which forms spool 7. This cross-section is such that one end of each of the inner bars of one set may be snugly secured within the notches between the teeth of one spider. The depth of the bar may vary, being somewhat greater at the charge end of spool 7 than at its discharge end, whereby the face of the spool possesses a slight taper to allow for thermal contraction of product tube or pipe. The end of the bar so adapted to fit snugly within a spider is notched on its inner side whereby the bar end may be fitted rigidly into the peripheral groove of and thus fastened to the spider.

Each bar of the first set of inner reciprocable bars 24 is reciprocably mounted at one end within slot 16 on the inner face of flange 9, lies along the surface of spool 7 to pass slidably through a notch in discharge-end flange 8 of the spool and is locked at its other end in operative relationship with end spider 18. A clamp ring 26 snugly fitted over and bolted onto the periphery of end spider 18 secures the first set of inner bars 24 thereto. A bar retainer ring 27 slides onto discharge-end flange 8, thereby restraining a first set of outer bars 35, described hereinafter. Each bar of the second set of inner reciprocable bars 25 immediately adjacent to and between each pair of inner bars 24 of the first set is reciprocably mounted at one end within slot 15 on the inner face of flange 8, lies along the surface of spool 7 to pass slidably through charge-end flange 9 of spool 7 and is operatively connected at its other end to middle spider 23. An anvil ring 28 slides onto charge-end flange 9 and restrains a second set of outer bars 36, described hereinafter.

Arranged on the outer surface of each inner bar of each set is a plurality of quadrilateral projections. Each projection provides (Fig. 8) an outer surface 29 parallel to the inner bar, an inclined lifting or expanding surface 31 sloping inwardly and forwardly of surface 29, a stop surface 32 extending at least perpendicularly, but preferably upwardly and backwardly to the bar, and a retracting surface 33 extending inwardly and forwardly toward the bar from the rear end of surface 29.

Immediately superposed on and in sliding contact with the outer surface of each of the inner reciprocable bars 24 and 25 are parallel, attenuated, alternately reciprocable bars 35 and 36, respectively, preferably having a cross-section which may be in the general shape of an isosceles trapezoid, the longer parallel side being curved somewhat to provide a more or less circular contour of the periphery of the assembled outer bars. Each outer bar has a plurality of openings in its inner surface generally corresponding in number, position and shape to the projections on each inner bar and interlocking therewith. Each opening (Fig. 8) has a first surface 34 generally parallel to and slightly larger than surface 29 of the inner projection. Extending from the rearward end of surface 34 is a surface 37 corresponding in length and orientation to retracting surface 33 of the projection of the inner bar. The forward end of surface 34 joins with a surface 38 corresponding in angularity to but being somewhat longer than lifting surface 31. Extending from surface 38 is a surface 39 corresponding to the above-described stop surface 32. Thus, when each pair of inner and outer bars is in operative relationship, the projection of the inner bar of each pair fits loosely within the opening of an outer bar of a pair.

That end of each outer bar 35 of the first set of bars (Fig. 10) bears an opening within which is mounted a spring 43 and a spring pin 44. A spring retaining annulus or ring 45 mounted on the face of discharge-end flange 8 which is adjacent to end spider 18 provides motion resisting means or a stop against which spring pins 44 bear. Similarly, the ends of outer bars 36 (Fig. 9) of the second set which contain similar springs and spring pins bear against teeth 11 of discharge-end flange 8 of spool 7.

Rigidly mounted on the drive end of inner shaft 17 (Figs. 3 and 7) is a first spider 46 which is a thin cylindrical disk having a peripheral groove 47. Rotatably mounted on main shaft 2 immediately adjacent to spider 46 is a cam sleeve 48 bearing a cam 49. Cam 49 comprises a flat cylindrical disk having a peripheral roller track 51 adapted to impart forward and backward motion axially of inner bars 25 for each 180° of cam rotation. Similarly, mounted on shaft 2 adjacent to middle spider 23 (Fig. 3) is a second cam sleeve 48′ bearing a second cam 49′ having a peripheral roller track 51′, each cam, sleeve and track being identical to the other.

First spider 46 is operatively connected to its adjacent cam 49 by cam roller support 52 and two rollers 53. Support 52 may comprise a thin-shelled, segmented, generally cylindrical member bolted or otherwise fastened within groove 47 of spider 46. Similarly, middle spider 23 is joined to its adjacent cam 49′ by roller support 52′ and rollers 53′, similar to roller support 52 and rollers 53. Roller support 52′ serves, however, to secure the ends of the second set of inner bars 25 to the spider. As each cam rotates, it bears upon the rollers and the cam roller support which convert the rotary motion of the cam to reciprocating movement of middle spider 23 and first spider 46 along the axis of spool 7.

Preferably, the cam tracks are designed to move inner bars 24 and 25 on spool 7 forwardly or toward the discharge end of main shaft 2 at constant velocity for about 5/6 of the operating cycle (i.e., during about 150° of rotation of the cam) for a distance of somewhat less than the depth of the depression or slot on the internal flat surface of each of flanges 8 and 9 on spool 7. During the non-feed period of approximately 1/6 of the operating cycle, the cam track withdraws the inner bars a distance slightly more than that through which they move during the service feed and then moves them forward to the point of starting.

Each cam is desirably displaced at such an angle from the other (measured along the circumference of the cam) that the inner bars pass through withdrawal or out-of-service motion at different times. For example, as shown in the drawings, each cam is preferably displaced about 90° from the other.

During each operating cycle, each set of inner bars starts its reciprocating motion from a rest or starting point nearest drive end 3 of the mandrel assembly. As the bars advance forward, the lifting surface 31 of each of the projections of each inner bar bears against and raises the corresponding surface 38 of the opening in the corresponding outer bar. The pressure exerted by this lifting surface, in conjunction with the motion resisting means associated with the outer bar, forces the outer bar away from the inner bar, i.e., raises it with respect to the axis of the mandrel, whereby it is placed in service or feed position. The outer bar continues to be raised until the stop surface 32 of the projection of the inner bar encounters the corresponding surface 39 of the opening. At this time, the outward movement of the outer bar stops. As the inner bar continues its lateral movement in a direction toward the operating end of spool 7, the combined force exerted thereon by the lifting surface and the stop surface of the projection in cooperation with the corresponding surfaces of the opening, advances the outer bar through the service feed portion of the cycle along a line parallel to the surface of spool 7. During this 5/6 of the entire cycle, the outer bar is thus in a position furthest removed from the surface of spool 7 and is laterally moving toward the operating end of that spool.

When each inner bar has reached the end of the service feed portion of the cycle (as determined by the configuration of its actuating cam), its lateral direction of movement is reversed. As it begins its movement in the other direction, the retracting surface 33 on the projection thereof bears against the corresponding surface 37 of the opening in the corresponding outer bar, whereby a downwardly directed force is generated which quickly pulls the outer bar into contact with the lower bar and away from the spirally wound tube. Thus, the outer surface of the outer bar is drawn closer to the surface of spool 7. When the outer bar is in contact with the inner bar, the force exerted by the retracting surface of the projection acting against the corresponding surface of the opening permits lateral movement in this lowered out-of-service position, whereby the outer bar is returned to the start position. The "drop-return-and raise" portion of the cycle occupies approximately 1/6 of the total time. When the bars have returned to start position, the cycle is then repeated.

As indicated above, the movement of the second set of bars (as shown in the drawings) is about 90° out of phase with that of the first set of bars. Accordingly, during each operating cycle, for each set of bars, all bars are engaging the tube or pipe, urging it forward, for approximately 2/3 of the time; and during a total of about 1/3 of the time, one set of bars is performing this function while the other set is in quick "drop-return-and raise" motion. Thus, by timing the cyclic movements of the bars of one set with the cyclic movements of the other set, continuous advancement of the spirally wound tube or pipe being formed is accomplished.

By way of illustration, Figure 3 shows inner bars 25 and corresponding outer bars 36 in feed service motion and inner bars 24 and corresponding outer bars 35 in out-of-service motion.

Although the hereinbefore described cam linkages represent the preferred embodiment, it may be noted that the described motion of the outer bars may be obtained by other systems, e.g. solenoid linkages, and pneumatic or hydraulic cylinders.

The entire assembly hereinbefore described is mounted on main support frame 5 (Fig. 1) by bearings 6 and 6′ within which main shaft 2 rotates. Rotary power input may be supplied from a main jack shaft 54 which is driven by means of a sprocket 50 connected by a chain (not shown) to a sprocket (not shown) on a variable speed motor (not shown). Jack shaft 54 is connected by a chain 55 to a sprocket 56 which drives a main drive shaft 57. Shaft 57 carries a sprocket 60 which is connected by a chain 58 to a sprocket 59 which is rigidly mounted on main shaft 2, whereby the entire assembly, including spool 7, spiders 18, 23 and 46 and inner shaft 17, is rotated. A change gear 61 on main drive shaft 57 drives an idle gear 62 which, in turn, drives a cam drive shaft 63. Cam drive shaft 63 is directly connected by means of gears 64 and 64' to cam sleeves 48 and 48' through cam gears 65 and 65' mounted on the sleeves, whereby each cam rotates at identical speed in the same direction, which is opposite to the direction of rotation of main shaft 2.

Mounted on main support frame 5 is a knitter jack shaft 66 adapted to be driven by gear contact (i.e. by means of gear 66a) with cam drive shaft 63. Knitter jack shaft 66 and a knitter drive shaft 71 are connected at one end of each by a chain 67 and sprockets 68 and 69, and at the other end of each by a chain 67' and sprockets 68' and 69', whereby drive shaft 71 may be rotated in direction opposite to that of the spool. A knitter wheel 72 which may be a wheel having a generally cylindrical outer surface is adjustably mounted on a shaft 74 which is held in place by a support 73 attached to frame 5. A sprocket 75 mounted on drive shaft 71 is connected by a chain 76 to a sprocket 77 keyed to a shaft 74a. Interposed between shafts 74 and 74a is a torque driving means 81 for the purpose of imparting power to drive knitter wheel 72. The position of the knitter wheel is such that its outer face is displaced from the outer surface of anvil ring 28 by a distance slightly less than the thickness of the thermoplastic material which is suitably deposited on the ring, whereby the knitter wheel will press the last convolution of material against the previous convolution on the ring to complete the weld.

Although a knitter wheel is shown as the pressure means for welding overlapping surfaces of the spirally wound material, any other suitable pressure means may be employed. Electrical or pneumatic, high-speed impact hammers having a speed, e.g., of at least 3000 impacts per minute have been found to provide better sealing and faster action than other pressure means.

If desired, a heating hood (not shown) comprising a steel cylinder lined, e.g. with Teflon (polytetrafluoroethylene resin) and containing a plurality of gas nozzles about its periphery may be positioned over spool 7 at a point immediately preceding the point of closest approach of the knitter wheel to the spool to maintain plastic ribbon at self-welding temperature.

In preferred operation of the self-stripping mandrel described in Figures 1 to 10, an extruder 78 feeds a thin strip of hot thermoplastic resin, e.g. polyvinyl chloride, preferably at a temperature of 360° F. to 395° F. in the form of a ribbon 79 onto the charge end of the mandrel. The peripheral speed of the mandrel must be slightly higher than the extrusion speed to keep a little tension in the ribbon. The advance of the tube or pipe on the mandrel must be less than the width of the extruded ribbon to allow lap required for welding. Both the peripheral speed of the mandrel and the advance of the tube on the mandrel, therefore, depend upon the conditions of extrusion. Each section of the ribbon overlies the preceding section immediately adjacent thereto. If desired, hot air at a temperature up to about 600° F. may be supplied around the area of deposition of the ribbon to prevent skin cooling of the ribbon. As the continuously extruded hot thermoplastic resin is fed onto the rotating mandrel, the hereinbefore described action of the inner and outer reciprocable bars permits continuous motion along the axis of the mandrel of the deposited thermoplastic resin. Simultaneously, rotation of the mandrel permits continuous overlapping of the feather-edge of that portion of the thermoplastic resin being laid down at least partially over that previously deposited, thus forming a cylindrical shell of thermoplastic resin. As the shell advances over the surface of the mandrel, it passes through a heating zone wherein the thermoplastic material and particularly the feather-edge underlying the deposited material may be kept at the temperature of the incipient welding point. This heated edge is then pressed by the knitter wheel against the previously deposited material and the two against the mandrel. Torque is desirably maintained on the knitter wheel whereby a force is exerted permitting formation of a tight seal between adjoining strips of the thermoplastic resin.

If desired, a primer or flux such as acetone may be present at the point of adhesion to insure a good bond. Further, if desired, an outer plastic shell composed, e.g. of Kralastic (acrylonitrile-butadiene copolymer), polyvinyl chloride or polyamide, may be spirally deposited as indicated over the tube or pipe in order to impart thereto mechanical strength.

A second embodiment including a self-stripping mandrel which is substantially the same as that illustrated in Figures 1 to 10 is illustrated in Figures 11 to 13. Referring to the latter drawings, the self-stripping mandrel which is non-rotatable is mounted on a main shaft 102. One set of the inner reciprocable bars (not shown) of the mandrel is actuated by a cam 103 through an inner oscillating shaft 104, and the second set (not shown) is actuated by a second cam 103'. Main shaft 102 is held stationary by a key 105 in frame 106, thereby preventing the mandrel from rotating. The cam drive power is detoured around the frame by back gears 107, 108, 109 and 111.

Pellets of thermoplastic resin such as polyvinyl chloride are fed into a hopper 112. A lower portion of the hopper is channel-shaped to fill scoops 113 and 113' on multiple planetary extruders 114 and 114'. Although two extruders are shown, one to four or more extruders may be used. Loss of pellets from the scoop on its downward passage is prevented by means of automatic gates 115 and 115'. The extruded ribbon 116 is delivered to the mandrel by nozzles 117 and 117'. The ribbon which forms a spiral as a result of the progressive self-stripping action of the mandrel has overlapping leading and trailing edges which are welded by means of electrical or pneumatic high-speed impact hammers 118 and 118'. One hammer is provided in conjunction with each extruder.

The spiral ribbon forms a continuous tube or pipe which is cooled by water sprays 119 and slides out over a flexible cupped disk 121 and then slides downwardly. Disk 121 retains compressed air introduced through a pipe 122 as a means for continuous testing of the pipe for holes or other defects.

Extruders 114 and 114' are mounted in circular frames 123 and 124 which rotate in ring bearings 125 and 126, respectively. The ring bearings and frame 106 are attached to a deck or floor plate 127. The extruder worm shafts 115a and 115a' are driven by planetary gears 128 and 128' which mesh with a sun gear 129. The sun gear is mounted on a free-running sleeve with a sprocket 131 which is driven by a chain 132 from a sprocket 133 on a variable speed motor 134 mounted on deck plate 127. A large gear 135 attached to or an integral part of circular frame 124 furnishes the power for the planetary motion of the extruders. Gear 135 is driven by a pinion 136 keyed to a shaft 137 which is connected to a motor 138 through a reducer 139. Shaft 137 drives cams 103 and 103' through sprockets 141 and 142 by means of a chain 143.

If desired, the tube or pipe-forming machine shown in Figures 11 to 13 may be used in conjunction with means for laying the tube or pipe in the ground as it is formed. For example, the means may comprise a truck (not shown) provided with a trailer-type chassis which is adapted to adjust the position and direction of the mandrel to follow the natural lay of the tube or pipe as it approaches the ground. The chassis is constructed in conventional manner to turn to the left and to the right, as well as up and down at various angles with horizontal.

While we have described preferred embodiments of the apparatus of the present invention, it will be understood that various modifications may be made in the design of the apparatus without departing from the spirit of the invention. By way of illustration but not in limitation of the scope of the invention, the self-stripping mandrel of the invention may be used to convey tubing through any type of wrapping station at which a covering layer of plastic ribbon or fabric impregnated with a sealant may be applied to previously wound tubing, and/or continuous metal ribbon or discontinuous wire wrapping or reinforcing may be supplied as either a final or intermediate layer of the finished structure.

We claim:

1. Apparatus for moving tubular structures through a processing station which comprises a mandrel, a plurality of generally parallel, attenuated, longitudinally reciprocable feeding members spaced around and longitudinally disposed on the mandrel to provide at least a portion of the circumferential surface thereof, a plurality of corresponding inner reciprocable actuating members, each engaging one of said feeding members, said actuating members being adapted, upon reciprocation, to move said feeding members cyclically outwardly from the mandrel in engagement with the inner surface of the tubing, forward with respect to the mandrel while in engagement with the tubing, inward out of engagement with the tubing and backward with respect to the mandrel while out of engagement with the tubing, and driving means for reciprocating the actuating members axially of the mandrel, whereby the tubular structure is advanced along the mandrel.

2. Apparatus for moving tubular structures through a processing station which comprises a mandrel, a plurality of generally parallel, attenuated, longitudinally reciprocable feeding members spaced around and longitudinally disposed on the mandrel, a plurality of corresponding inner reciprocable actuating members, each engaging one of said feeding members, said actuating members being longitudinally disposed between the mandrel and feeding reciprocable members, and means associated with each of said corresponding feeding and actuating members adapted to move the former, upon reciprocating movement of the latter, cyclically outward in engagement with the tubing, forward with respect to the mandrel while in engagement with the tubing, inward out of engagement with the tubing and backward with respect to the mandrel while out of engagement with the tubing, and a driving member for reciprocating the actuating members axially of the mandrel, whereby the tubing is advanced along the mandrel.

3. Apparatus for moving thermoplastic, tubular structures through a processing station which comprises a rotatable mandrel adapted to receive on its outer surface a continuous ribbon of thermoplastic material in spiral form from a stationary extruder, a plurality of generally parallel, attenuated, longitudinally reciprocable feeding members spaced around and longitudinally disposed on the mandrel, a plurality of corresponding inner reciprocable actuating members, each engaging one of said feeding members, said actuating members being longitudinally disposed between the mandrel and feeding members, means associated with each of said corresponding feeding and actuating members adapted to move the former, upon reciprocating movement of the latter, cyclically outward in engagement with the tubing, forward with respect to the mandrel while in engagement with the tubing, inward out of engagement with the tubing and backward with respect to the mandrel while out of engagement with the tubing, and a driving member for reciprocating the actuating members axially of the mandrel, whereby the tubing is advanced along the mandrel.

4. Apparatus for moving thermoplastic, tubular structures through a processing station which comprises a stationary mandrel adapted to receive on its outer surface a continuous ribbon of thermoplastic material in spiral form from a rotatable extruder, a plurality of generally parallel, attenuated, longitudinally reciprocable feeding members spaced around and longitudinally disposed on the mandrel, a plurality of corresponding inner reciprocable actuating members, each engaging one of said feeding members, said actuating members being longitudinally disposed between the mandrel and feeding members, means associated with each of said corresponding feeding and actuating members adapted to move the former, upon reciprocating movement of the latter, cyclically outward in engagement with the tubing, forward with respect to the mandrel while in engagement with the tubing, inward out of engagement with the tubing and backward with respect to the mandrel while out of engagement with the tubing, and a driving member for reciprocating the actuating members axially of the mandrel, whereby the tubing is advanced along the mandrel.

5. Apparatus for moving tubular structures through a processing station which comprises a mandrel having an outer surface composed of at least two sets of generally parallel, attenuated, longitudinally reciprocable feeding members spaced around and longitudinally disposed on the mandrel, the individual members of each set alternating with the individual members of the other set(s), corresponding sets of inner reciprocable actuating members, each actuating member engaging one of said feeding members, said actuating members being longitudinally disposed between the mandrel and feeding members, means associated with each of said corresponding feeding and actuating members adapted to move the former, upon reciprocating movement of the latter, cyclically outward in engagement with the tubing, forward with respect to the mandrel while in engagement with the tubing, inward out of engagement with the tubing and backward with respect to the mandrel while out of engagement with the tubing, and a cam engaging each set of actuating members and adapted to reciprocate the actuating members axially of the mandrel, each cam being displaced at such an angle from the other cam(s) so that at least one set of actuating members is at any given instant in the outwardly extending, forwardly moving position, whereby the tubing is continuously advanced along the mandrel.

6. Apparatus for moving tubular structures formed from ribbon of thermoplastic material through a processing station which comprises pressure means for sealing overlapping ribbon of thermoplastic material, a mandrel having an outer surface composed of at least two sets of generally parallel, attenuated, longitudinally reciprocable feeding members spaced around and longitudinally disposed on the mandrel, the individual members of each set alternating with the individual members of the other set(s), corresponding sets of inner reciprocable actuating members, each actuating member engaging one of said feeding members, said actuating members being longitudinally disposed between the mandrel and feeding members, means associated with each feeding member for exerting axial force against forward motion, each of said corresponding feeding and actuating members having cooperating adjacent surfaces which are adapted to move the former, upon reciprocating movement of the latter, cyclically outward in engagement with the tubing, forward with respect to the mandrel while in engagement with the tubing, inward out of engagement with the tubing and backward with respect to the mandrel while out of engagement with the tubing, and a cam engaging each set of actuating members and adapted to reciprocate the actuating members axially of the mandrel, each cam being displaced at such an angle from the other cam(s) so that at least one set of actuating members is at any given instant in the outwardly extending, forwardly moving position, whereby the tubing is continuously advanced along the mandrel.

7. Apparatus for moving tubular structures formed from ribbon of thermoplastic material through a processing station which comprises a high-speed impact hammer for sealing overlapping ribbon of thermoplastic material, a mandrel having an outer surface composed of at least two sets of generally parallel, attenuated, longitudinally reciprocable feeding members spaced around and longitudinally disposed on the mandrel, the individual members of each set alternating with the individual members of the other set(s), corresponding sets of inner reciprocable actuating members, each actuating member engaging one of said feeding members, said actuating members being longitudinally disposed between the mandrel and feeding members, means associated with each feeding member for exerting axial force against forward motion, each of said corresponding feeding and actuating members being provided with cooperating, adjacent lifting expanding surfaces having at least a portion thereof angularly inclined with respect to the mandrel which are adapted to move the former, upon reciprocating movement of the latter, cyclically outward in engagement with the tubing, forward with respect to the mandrel while in engagement with the tubing, inward out of engagement with the tubing and backward with respect to the mandrel while out of engagement with the tubing, and a cam engaging each set of actuating members and adapted to reciprocate the actuating members axially of the mandrel, each cam being displaced at such an angle from the other cam(s) so that at least one set of actuating members is at any given instant in the outwardly extending, forwardly moving position, whereby the tubing is continuously advanced along the mandrel.

References Cited in the file of this patent
UNITED STATES PATENTS

| | | |
|---|---|---|
| 2,175,218 | Samerdyke | Oct. 10, 1939 |
| 2,260,565 | Furness | Oct. 28, 1941 |
| 2,674,007 | Allemann et al. | Apr. 6, 1954 |